United States Patent [19]

von Danwitz

[11] Patent Number: 4,584,785
[45] Date of Patent: Apr. 29, 1986

[54] IDENTIFICATION MEANS FOR SLINGS

[75] Inventor: Hans-Otto von Danwitz, Kaarst, Fed. Rep. of Germany

[73] Assignee: Spanset Inter AG, Basel, Switzerland

[21] Appl. No.: 556,271

[22] Filed: Nov. 30, 1983

[30] Foreign Application Priority Data

Dec. 6, 1982 [DE] Fed. Rep. of Germany ... 8234186[U]

[51] Int. Cl.$^4$ .............................................. G09F 3/00
[52] U.S. Cl. ...................................... 40/316; 40/625
[58] Field of Search .................... 40/2, 20, 21, 19, 316, 40/625

[56] References Cited

U.S. PATENT DOCUMENTS

| 3,088,237 | 5/1963 | Plummer | 40/316 |
| 3,551,542 | 12/1970 | Perrone | 40/316 |
| 3,650,059 | 3/1972 | Johnson | 40/316 |
| 3,894,731 | 7/1975 | Evans | 40/316 |
| 4,139,956 | 2/1979 | Sharrow | 40/316 |
| 4,336,087 | 6/1982 | Martuch et al. | 40/316 |

Primary Examiner—Gene Mancene
Assistant Examiner—Wenceslao J. Contreras
Attorney, Agent, or Firm—Spencer & Frank

[57] ABSTRACT

In a strap or tubing of woven fabric and/or plastic for fastening, lifting and transporting purposes, in particular for a round sling tubing, the strap (1) or the tubing (7) is provided with symbols (5), patterns, numbers or the like, which extend from at least one surface (6) of the strap or tubing to a space plane different therefrom.

3 Claims, 4 Drawing Figures

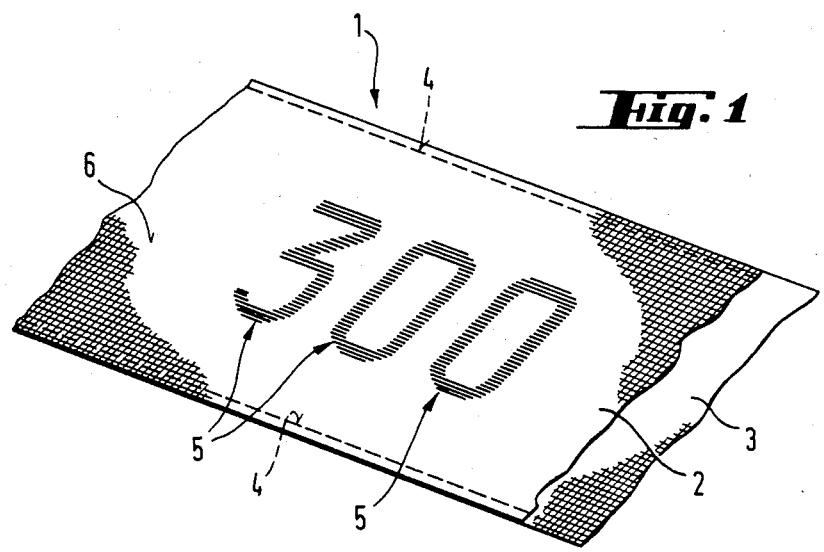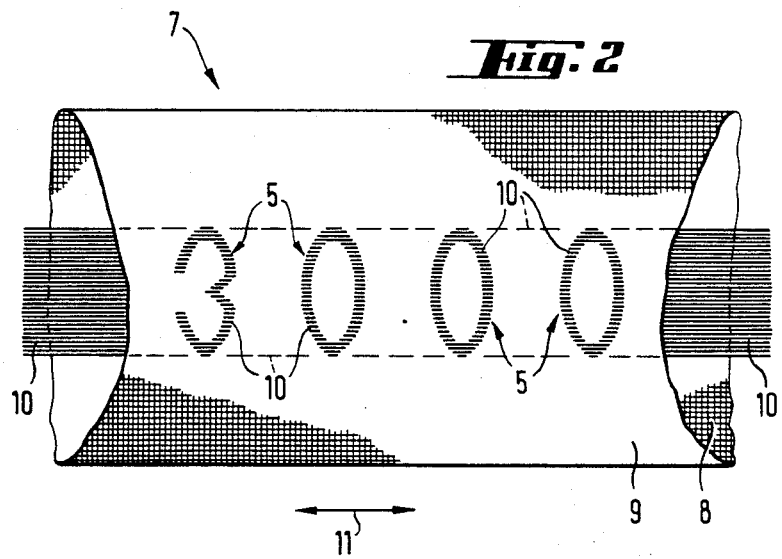

IDENTIFICATION MEANS FOR SLINGS

BACKGROUND OF THE INVENTION

The invention relates to a strap or tubing for fastening, lifting, and transporting purposes, and particularly to a round sling tubing.

Such straps or tubings are known and are used widely. Depending on their intended purpose, they are made in various widths and by different production techniques. As a rule, they are flat and frequently made of a plurality of layers, particularly if they are made of a woven fabric. They may, however, also be used as protective tubing or a round sling according to German Auslegeschrift (Examined Published Application) No. 2,129,837 (=Canadian Pat. No. 953,882) or European Patent No. 0,032,749 (=Canadian Pat. No. 1,153,037), in which the load itself is taken up by a skein of threads disposed inside the tubing, with the tubing serving only to hold the skein together and to protect it against abrasion, dirt and damage without itself supporting the load. If, for the sake of simplicity, general reference is made to "straps", this is also intended to cover flexible tubing of the above-mentioned type.

For the user of such straps it is always important to know to what load the strap may be subjected. It is therefore customary to indicate the maximum load in suitable units or symbols on the strap. For this purpose, the units or symbols are usually printed on one flat side of the strap, are indicated by corresponding units or symbols on attached or sewn-on labels and/or such units or symbols are printed on labels which are attached to or sewn onto the strap.

The prior-art straps with their printed-on or otherwise inscribed symbols have the disadvantage that the information represented by the symbols fades very quickly, becomes soiled or otherwise illegible. They have the further drawback that they cannot be recognized at all under poor light conditions.

SUMMARY OF THE INVENTION

It is therefore the object of the invention to further improve the prior-art straps in such a manner that the information indicated on the straps remains permanently legible and can be recognized even under poor light conditions or if the strap is soiled. The solution of this problem resides in that the strap is provided with symbols, patterns, numbers or the like which extend from at least one strap surface into a space plane different therefrom. As a rule, the symbols are disposed on the strap surface in a raised manner which can be done by weaving, embroidering, glueing or welding the symbols on in a raised manner. As a further feature of the invention, it is also possible to stamp these symbols in deeply.

For a preferred embodiment, it is proposed that the symbols having a color different from the strap or tubing material, in particular a color contrasting with the strap or tubing color are made of plastic filaments or sheets which are dyed in bulk since, even if greatly soiled, the area surrounding the symbols behaves differently in coloring or in the degree of soiling than the bulk-dyed plastic filaments or sheets used for the symbols. Advisably, the plastic filaments are spin dyed which assures particularly good color fastness.

Because of the fact that the symbols extend from at least one strap surface into a space plane different therefrom, for example are woven on in a raised manner, etc., it is accomplished that the symbols are not only legible but can also be felt by touching. If the strap is soiled, the dirt can easily be removed, for example by wiping, to such an extent that the raised symbols are again discernible, for example by touch. Use of the preferred, proposed spin-dyed plastic material avoids that the raised symbols become unrecognizable due to abrasion. Of course, this preferred embodiment is not obligatory since any other desired yarns, threads, etc. can be used for the weaving on, embroidering on, etc., although bulk-dyed filaments are distinguished by particular durability.

In a particularly advantageous embodiment of a strap or tubing made of a woven fabric, the plastic filaments forming the symbols are warp threads which extend in the longitudinal direction of the strap or tubing. This embodiment takes account of the fact that straps or tubing of the type according to the invention are pulled under tension in the longitudinal direction of the strap over sharp edges or corners. If then the symbols are woven in in a raised manner, the warp threads forming the symbols glide lengthwise over the edges without being caught behind them and without being subjected to the danger of tearing. In the embodiment of the invention as tubing, particularly a protective tubing for a round sling, the symbols may be produced particularly easily in that outside the symbols the warp threads forming them extend loosely in the tubing interior parallel to the tubing fabric and are not bound by the weft threads of the tubing fabric. As a result, the individual symbols can also be arranged with larger spaces between them in a particularly noticeable manner without interference from the warp threads which, in the interior of the tubing, extend loosely parallel to the tubing fabric where they cannot be seen from the outside.

BRIEF DESCRIPTION OF THE DRAWINGS

FIG. 1 is a perspective view of a section of a woven double strap or a tubing with raised woven-on numerical symbols;

FIG. 2 is a plan view of a woven tubing as is used, for example, as protective tubing for a round sling of the type mentioned at the beginning;

DESCRIPTION OF THE PREFERRED EMBODIMENTS

Figure 3:
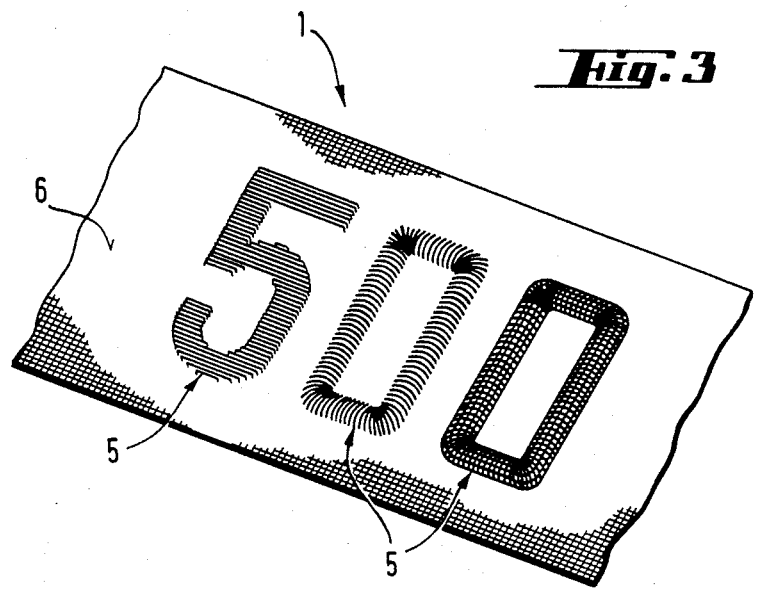
FIG. 3 is a perspective view of a woven single strap with raised woven-on or embroidered-on numerical symbols.

In the drawing, the strap as a whole is designated as 1. As shown in FIG. 1, it consists of several layers 2, 3 of a suitable woven fabric or of a combination of a woven fabric with a plastic layer. In the illustrated embodiment, the two layers 2, 3 are connected together by seams 4 but this is in no way necessary. In the embodiment shown in FIG. 3, the strap is a single-layer strap.

It is apparent from the drawing that the strap is provided with symbols 5 in the form of numbers, patterns or the like. It is essential that these symbols extend from at least on strap surface 6 to a space plane different therefrom. This may mean that the symbols, numbers or the like project from the strap surface in a raised manner as illustrated in FIGS. 1 to 3 or alternatively are stamped into the strap as shown in FIG. 4.

The tubing illustrated in FIG. 2 comprises a tubing fabric including lower layer 8 and upper layer 9. The plastic filaments 10 forming symbols 5 are warp threads which extend in the longitudinal direction 11 of the tubing. In the region outside symbols 5, warp threads 10 extend in the tubing interior formed between lower layer 8 and upper layer 9, loosely parallel to the tubing fabric and are not bound by the weft threads of the tubing fabric.

For reasons of clarity, FIG. 3 shows various ways in which symbols 5 can be applied. Thus, the numerical symbol "5" shown on the left in FIG. 3 is woven in in a raised manner. The two zeros next to it on the right are embroidered in a raised but different manner. It is also possible to glue the symbols 5 on in a raised manner or to weld them on, in which case the symbols must be made of thermoplastic threads or sheet pieces.

Figure 4:
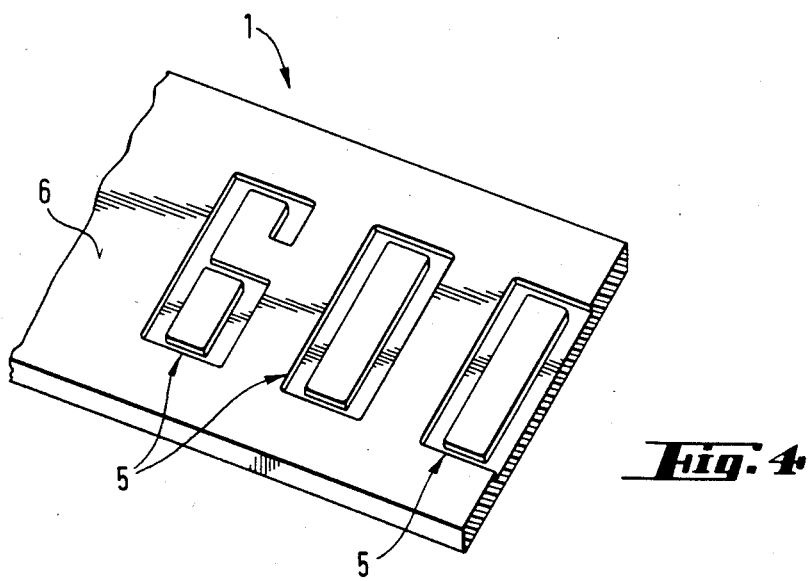
FIG. 4 is a perspective view of a section of a plastic strap with stamped-in numerical symbols.

In FIG. 4, a strap is illustrated in the form of an extruded, rolled or otherwise produced plastic strip. The strip has a thickness of a few millimeters and it is apparent that symbols 5 are stamped in deeply.

The invention considerably increases the practical usefulness of the straps. This is particularly important for rough treatment in open places where soiling of the straps is inevitable. In these cases as well, the novel strap design makes it possible for the first time to easily determine the loadability of the straps without having to employ special measures, tools, or the like.

What is claimed is:

1. In a round sling for lifting and transporting purposes, said round sling having a protective tubing of a woven textile fabric surrounding a skein of threads for carrying the load, the improvement wherein:

said tubing is provided with symbols which project in a raised manner beyond the exterior of the tubing surface and which are formed by warp threads of the tubing fabric, said warp threads being spin-dyed plastic threads which extend in the longitudinal direction of the tubing and which have a color which contrasts with the tubing color.

2. The round sling of claim 1 wherein, outside the symbols, the warp threads extend in the interior of the tubing, are not bound into the tubing fabric, and extend loosely parallel to the tubing fabric.

3. The round sling of claim 1, wherein the symbols indicate the maximum load to be carried by the sling.

* * * * *